Figure 1:
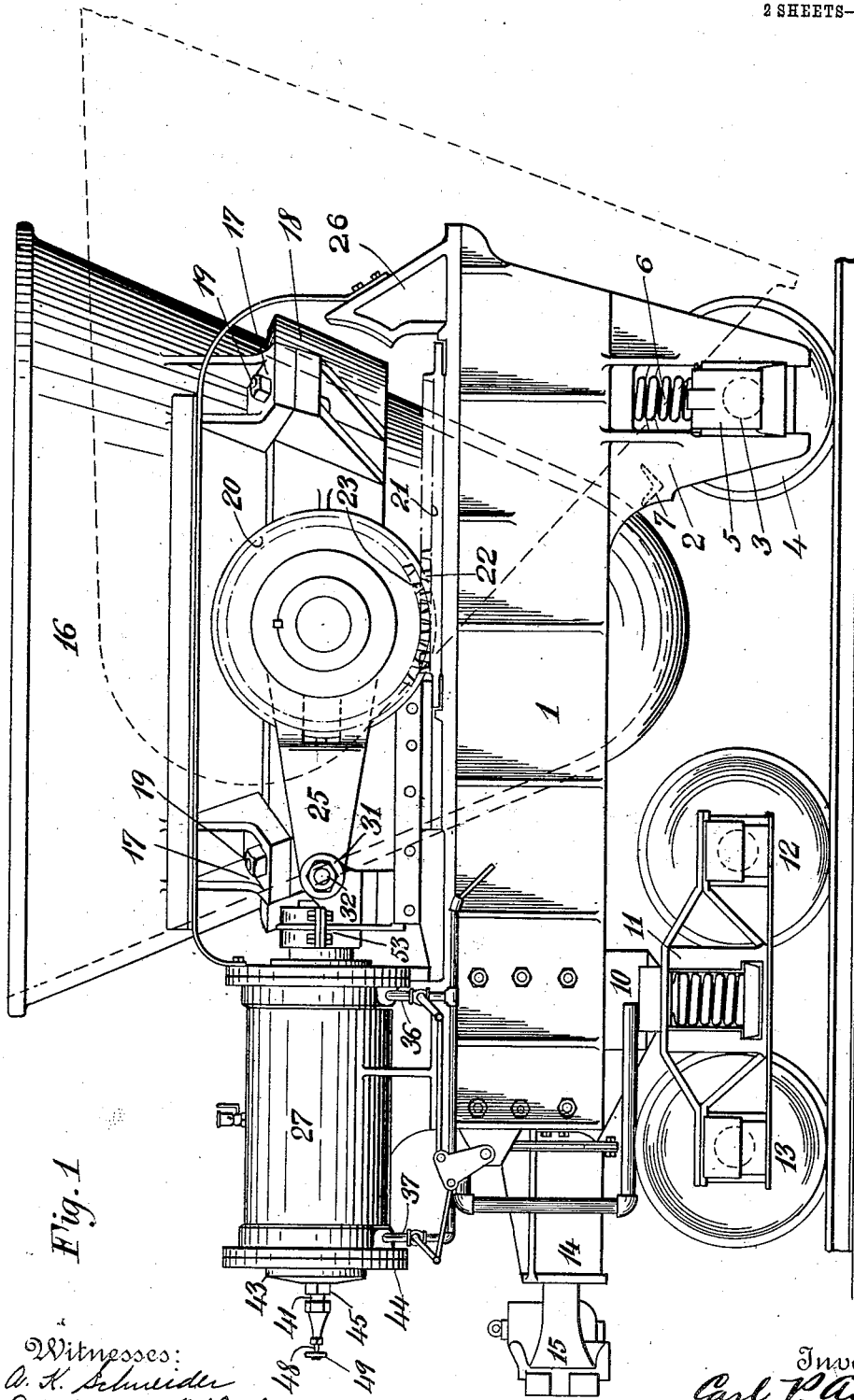

C. P. ASTROM.
DUMPING CAR.
APPLICATION FILED NOV. 16, 1909.

954,560.

Patented Apr. 12, 1910.
2 SHEETS—SHEET 1.

Witnesses:
O. K. Schneider
Edmund O. Duboeq

Inventor
Carl P. Astrom,
By his Attorneys
Edwards, Sager & Wooster

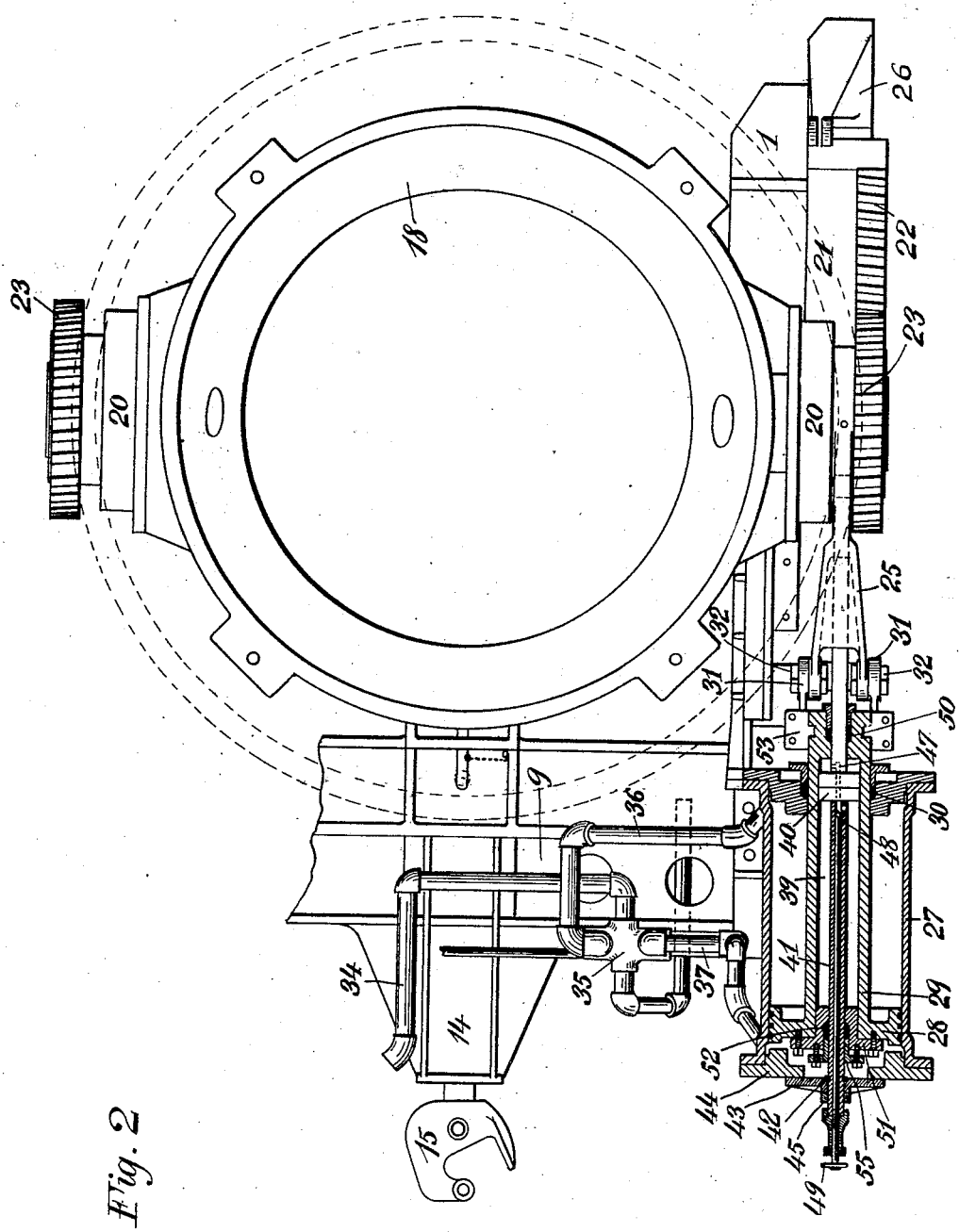

UNITED STATES PATENT OFFICE.

CARL P. ASTROM, OF HASBROUCK HEIGHTS, NEW JERSEY, ASSIGNOR TO M. H. TREADWELL COMPANY, OF NEW YORK, N. Y., A CORPORATION OF NEW YORK.

DUMPING-CAR.

954,560.   Specification of Letters Patent.   Patented Apr. 12, 1910.

Application filed November 16, 1909. Serial No. 528,270.

*To all whom it may concern:*

Be it known that I, CARL P. ASTROM, a citizen of the United States, residing at Hasbrouck Heights, in the county of Bergen and State of New Jersey, have invented certain new and useful Improvements in Dumping-Cars, of which the following is a full, clear, and exact specification.

This invention relates to dumping cars, and more particularly has reference to dumping cars adapted to carry cinders, molten metal, and the like, wherein the car is loaded and transported to a distance, and then dumped by mechanical power.

The object of the invention is to provide improvements in the actuating mechanism, whereby the movement of the car body in dumping is more readily controlled, and also to provide a mechanism wherein the checking devices are contained within the actuating cylinder, but capable of adjustment and inspection without dismantling the cylinder.

A further object of the invention is to provide a motor mechanism, wherein the actuating piston will have a greater effective area in dumping the loaded car body than in returning the empty car body to upright position, thereby involving less strain upon the mechanism, economizing power and enabling the empty car body to be more effectually controlled.

As herein shown, the invention is applied to a single end dumping car, generally of the type shown in the patent to Treadwell and Astrom, No. 892,385, dated June 30, 1908.

The invention is shown with respect to one form thereof in the accompanying drawings, wherein—

Figure 1 is an elevation of dumping car embodying the invention, and Fig. 2 is a partial plan view sufficient to show the actuating connections and relative arrangement of parts.

1 represents side frames (only one being shown), having at one end, pedestals 2, in which an axle 3 carrying wheels 4 is mounted, the car body being supported between the axle box 5 and the frame by spring 6. Side frames 1 are connected at the rear end by traverse bracing 7. At the front end, the side frames 1, which preferably are of steel castings, are connected by cross frame 9, securely bolted thereto and carrying a body bolster 10 connected to a bogie truck 11, having wheels 12. At the front of the cross frame 9 is provided a draw head 14 having a standard railway coupling 15 therein and any usual draft rigging between the coupling and the car body.

16 is the car body, herein shown as a ladle, having rigid lugs 17, which rest on a bail or yoke 18, the bail and ladle being bolted together by bolts 19. The bail 18 carries diametrically opposite trunnions 20, which roll on tracks 21 formed on the side frames 1. Also formed on the side frames 1 are racks 22 on which roll gears 23, rigidly carried with the trunnions 20. Between the roller 20 and the gear 23 is a cylindrical portion which is embraced by the strap of a yoke 25, so that as the yoke 25 is reciprocated the roller 20 and the gear 23 roll on the track 21 and 22 respectively.

26 is a stop mounted on the side frames for limiting the endwise movement of the trunnions in dumping.

In order to dump the car body and return it to upright position, there is mounted on one of the said frames 1 a stationary actuating cylinder 27, containing a piston 28 connected with a hollow piston rod 29 passing through a stuffing box 30, and carrying a crosshead 31, which slides on a track formed on the side frames 1. The crosshead 31 is suitably connected to the yoke 25, as by bolts 32. To operate the piston, and thereby actuate the car body, a supply pipe 34 leading through a controlling valve 35, and thence by pipes 36 and 37 to the respective ends of the cylinder, is provided, the valve admitting fluid pressure to one side of the piston, while opening the other side of the piston to exhaust.

In dumping a heavily laden car, it is desirable to provide fluid pressure means for controlling the rate of movement of the car body, as it is liable to acquire considerable momentum after it has once been started and has passed the dead center. In order to provide a fluid controlling means which will be effective and easily controlled, while at the same time disposed so as to be protected against injury, the actuating piston is made hollow, and the checking means combined with the hollow piston. At the same time, the parts are so arranged that the actuating piston has a greater effective area in moving the car body outward to dumping position than it has in returning the car body from dumping position to normal position. In order to accomplish this, the hollow piston 29 is bored to form a fluid checking chamber 39, containing a stationary piston 40 mounted on a rod 41, held at one end by a ring 42 and the cylinder head 43, which cylinder head 43 is separable from the main cylinder head 44 for the purposes hereinafter to be described. At the other side of cylinder head 43 is a clamping collar 45. The rod 41 contains a small passage 47 connecting opposite sides of the stationary piston 40, and mounted at one end of the rod is a needle valve 48, which may be adjusted by an outside handle 49 to control the area of the passage, and thereby the rate of retardation. It will be understood that the space 39 will be filled with a fluid such as oil, and as the piston 29 moves in the cylinder 27 the oil will be forced back and forth between opposite sides of piston 40. The rod 41 passes through a stuffing box 50 in the hollow piston rod 29 at one end, and the piston 28 carries a head 51 and a stuffing box 52 for the rod 41 at the other end.

When it is desired to remove the piston 28, this can be done by releasing the split coupling 53 connecting the forward end of the piston rod 29 with the crosshead 31, and then the piston 29 can be withdrawn through the end of the main cylinder 27. When it is desired to inspect or repair the stuffing box 52, this can be done by removing the small head 43, having first unscrewed the needle valve stem and the collar 45. Then the gland 55 for stuffing box 52 can be removed as the rod 41 can be drawn to the left of Fig. 2 a sufficient distance without being pulled through the stuffing box 50. It will thus be seen that all of the wearing parts of this motor actuating mechanism are rendered easily accessible without dismantling the cylinder or the car body, and that the checking rate can be varied readily by the needle valve.

It is thought that the operation will be clear in view of the foregoing description, it being seen that when the fluid actuating pressure is applied on the large end of the piston 28 to dump the car, greater power will be secured than when it is applied to return the car to central position.

Various modifications and changes may be made in the specific construction without varying from the scope of the invention.

Having thus described my invention, I declare that what I claim as new and desire to secure by Letters Patent, is,—

1. The combination in dumping car, with a car-body mounted to discharge at one end, of a cylinder for actuating the car-body to and from dumping position, and a checking cylinder within said actuating cylinder.

2. The combination in a dumping car, of a tilting car-body, a cylinder and piston for actuating the car-body to and from dumping position, and a checking device for said car-body comprising a moving cylinder and stationary piston within said actuating cylinder.

3. The combination in a dumping car, of a tilting and endwise movable car-body, an actuating cylinder and piston having a greater actuating area in one direction than in the other, and checking means in the cylinder effective in both directions.

4. The combination with a dumping car-body mounted to tilt on trunnions, of a cylinder and piston connected to actuate said car-body, a stationary checking piston within the actuating piston, and means for regulating the passage of fluid between the sides of said checking piston to control the speed.

5. In a dumping car, in combination with a power actuating cylinder including a hollow piston, a stationary checking piston within said hollow piston, and a passage between opposite sides of said stationary piston.

6. In a dumping car, in combination with a power actuating cylinder including a hollow piston, a stationary checking piston within said hollow piston, a passage between opposite sides of said stationary piston, and means for regulating the area of said passage.

In testimony whereof I affix my signature, in presence of two witnesses.

CARL P. ASTROM.

Witnesses:
J. S. WOOSTER,
GEO. N. KERR.